J. BROPHY.
COUNTING SCALE.
APPLICATION FILED JULY 6, 1914.
1,309,602.
Patented July 8, 1919.
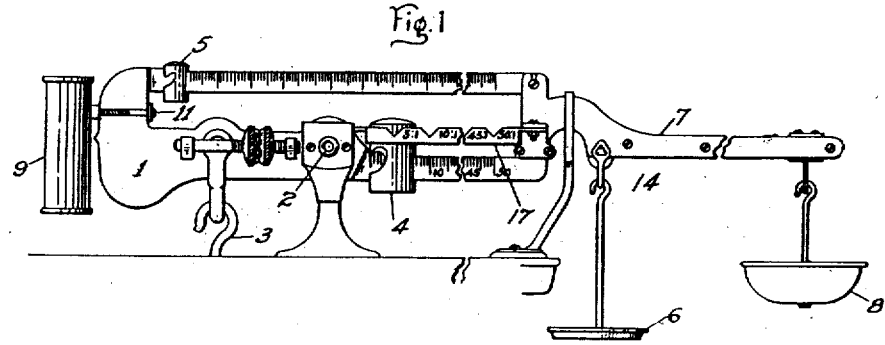
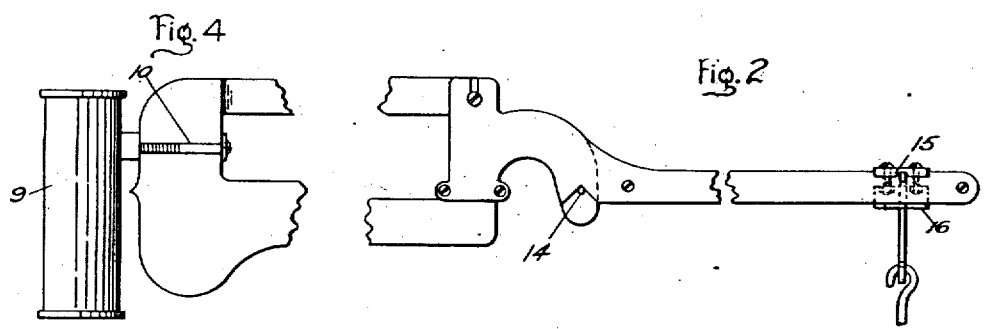
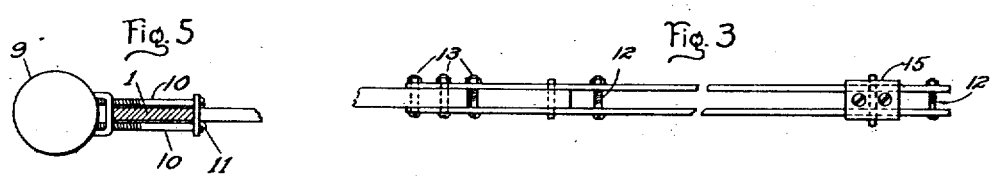
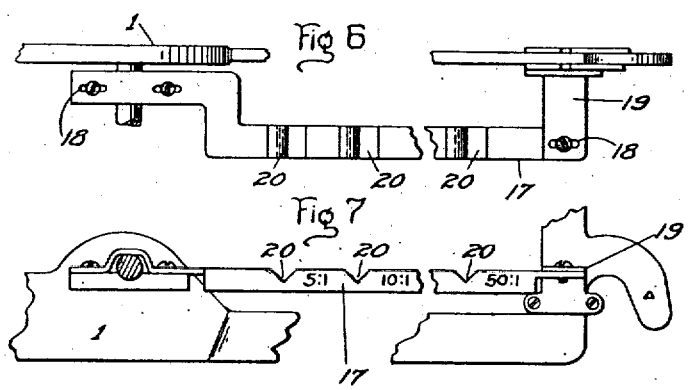
WITNESSES:
Hurley Baldy Jr.
John F. Bartlett.
INVENTOR
JEREMIAH BROPHY
by Charles M. Blair
Atty.

UNITED STATES PATENT OFFICE.

JEREMIAH BROPHY, OF SCHENECTADY, NEW YORK.

COUNTING-SCALE.

1,309,602.    Specification of Letters Patent.    Patented July 8, 1919.

Application filed July 6, 1914. Serial No. 849,069.

*To all whom it may concern:*

Be it known that I, JEREMIAH BROPHY, a citizen of the United States, residing at Schenectady, county of Schenectady, State of New York, have invented certain new and useful Improvements in Counting-Scales, of which the following is a specification.

My invention relates to computing scales, particularly those suitable for counting articles quickly and accurately. The object of my invention is to provide a weighing scale which can be used as a counting device without interfering with its use as a weighing scale. Another object is to provide means by which an ordinary beam weighing scale can at will be easily, quickly and cheaply converted into an accurate and easily manipulated counting scale without interfering in any way with its utility as a weighing scale so that it can be used indifferently for either weighing or counting. Another object is to provide a scale which will count in either small or large multiples at will.

In carrying out my invention I may, for example, provide a platform scale of the usual type with suitable means for holding or carrying an article, such as a bolt, for example, on the scale beam in such relation to the pivot of the scale beam that one article will balance some convenient number, such as 100, like articles on the platform of the scale. The means for carrying the article on the scale beam is so arranged that there is no interference with weighing, and if desired the articles on the platform of the scale can be weighed and counted at the same time. This method of counting is very accurate, as there is no necessity of determining accurately the absolute weight either of one article or of the mass of articles on the scale platform. A definite number of articles on the platform will balance the one article carried by the beam regardless of the actual weight of the articles. My invention may be embodied in the scale when it is built, but I prefer to embody it in an attachment which may at will be secured to any ordinary beam scale to convert it into a counting scale. The attachments are preferably in the form of one or more counting bars secured to the beam, and an equalizer also secured to the beam to neutralize the weight of the counting bar. The counting bar is so constructed that one article carried by it will counterbalance some definite and convenient number of identical articles on the platform. I may also construct the scale in such a way that it will count in small multiples, such as ten, twenty, etc., and also in multiples of hundreds, as desired.

My invention will best be understood in connection with the accompanying drawing, in which, merely for purposes of illustration, I have shown one of the many forms in which my invention may be embodied, and in which Figure 1 is an elevation of the beam of an ordinary platform scale provided with a counting attachment and embodying my invention; Fig. 2 is an enlarged elevation of the beam extension counting bar; Fig. 3 is a plan view of the same bar; Fig. 4 is a side view of the equalizer; Fig. 5 is a plan view of the equalizer; Fig. 6 is a plan view of the side counting bar attached to the beam; and Fig. 7 is a side view of the side counting bar.

Merely for illustration I have shown my invention as applied to the beam of a platform scale of the usual and well known form. In the particular form shown the weighing beam 1 is provided with a pivot 2 and is connected by a hooked rod 3 to the platform or receiver of the material to be weighed. The articles on the platform are weighed in the usual manner by means of the usual weighing members associated with the weighing beam. In the particular scale shown, for example, the weighing members are a large poise 4 and a smaller poise 5, as well as the counterpoise 6 which is attached to the end of the beam and on which extra weights may be placed, if desired.

By my invention this or any similar form of weighing scale can also be used as a counting scale. To accomplish this result without interfering with the utility of the scale for weighing I provide suitable additions to the beam 1 for enabling the operator to count articles by merely piling them on the platform of the scale until the beam lifts, whereupon he knows that a definite number of the articles are on the platform. I prefer to make these additions on the form of attachments which can at will be quickly and easily secured to the beam of any ordinary scale.

In the particular form of attachment shown the counting bar is made in the form of a beam extension 7 secured in any suitable manner to the beam, and is provided with some suitable holding means such as counting cup 8, for holding one or more of the articles to be counted in such a relation to the beam 1 that when one article is in the counting cup and some definite and convenient number—for example, one hundred, of the articles are on the platform the scale will just balance. It is usually desirable and convenient to have one article in the cup balance some even and rather large number of articles on the platform and to accomplish this result the counting cup is mounted at a point beyond the end of the beam. To eliminate and neutralize the effect of the weight of the attachments I secure an equalizer 9 to the beam in any suitable manner, as for example, by means of screws 10 and a clamp 11. This equalizer may be adjusted by varying either its weight or its position. It may be of any convenient form, but is preferably made as a cylindrical receptacle, and its weight varied by putting more or less material into it. The desired adjustment may also be secured by moving the equalizer bodily, in some suitable manner. The equalizer exactly balances the weight of all the other attachments to the beam 1, and consequently the scale is as accurate and sensitive as though there were no attachments to the beam.

The operation of counting with a scale embodying my invention is as follows: All weights are taken off the counterpoise 6, and the poises 4 and 5 are set at zero, whereupon the scale balances. The scale is now ready for counting. One of the articles to be counted, as, for example, a bolt, is placed in the counting cup 8. Then identical bolts of the same size and weight as the bolt in the cup are placed on the platform until the beam lifts, whereupon the operator knows that there are a definite number of bolts on the platform. The exact number required to raise the beam and balance the scale depends, of course, upon the scale and the distance of the counting cup from the pivot 2. I prefer to so proportion the parts that one article in the counting cup 8 will balance one hundred or some multiple of a hundred articles on the platform. If desired, several bolts may be placed in the counting cup, in which case the number of bolts which must be placed on the platform to balance the scale will be correspondingly multiplied.

The number of articles is determined very quickly, and more accurately than by dividing the weight in pounds of a mass of bolts by the weight of one bolt, since the ordinary scale will not weigh one bolt or similar article with the great accuracy necessary to give a correct result. With my invention it is unnecessary to know the weight of one bolt or of the mass of bolts. The count is very accurate, and if, for example, there is one bolt too many on the platform the entire weight of that extra bolt is available to move the beam 1 out of its balanced position, and consequently a sharp indication is obtained when the correct number is on the platform.

To facilitate attaching the beam extension 7 to the beam I prefer to construct it, as shown in Figs. 2 and 3, of two parallel bars positioned by spacers or screws 12 and clamped to the end of the scale beam by clamping screws 13. Notches or recesses in the parallel bars fit over the beam pin 14 on which the counterpoise 6 is hung, and position the extension 7 on the beam. The article holder, such as the counting cup 8, is preferably secured to the beam extension 7 in some manner which permits it to be adjusted or moved along the beam extension 7 at will. The particular means shown is a clamp comprising two members 15 and 16 drawn together by screws to engage the edges of the beam extension 7. The cup 8 is suspended from this clamp, which can be moved along the beam extension until one article in the cup balances the desired number of articles on the platform.

In many cases it is desirable that the scale count in multiples smaller than the multiples of one hundred or more obtained by the beam extension 7 and cup 8. In such cases I provide a counting bar by which the article can be held closer to the pivot 2 than by the beam extension 7, so that one article on the counting bar will balance five, ten or some other small number of articles on the platform. For example, I may, as shown in Figs. 6 and 7, provide an auxiliary counting bar 17 secured to the beam 1 in any suitable manner. For example, I may use clamping members, provided with slots 18, which permit adjustment of the counting bar with relation to the beam 1 and pivot 2. In the particular arrangement shown one end of the auxiliary counting bar is clamped to the pivot 2 and the other end to a bracket 19 detachably mounted near the end of the beam, either directly on the beam or on the beam extension 7. The auxiliary counting bar 17 is mounted in such a way that it does not interfere with the use of the scale for weighing.

Some suitable provision is made to hold an article on the auxiliary counting bar in such a position that it will balance five, ten, or some other definite number of articles on the platform of the scale. A convenient form of holder is a V shaped recess 20 formed in the auxiliary counting bar 17 and of such a size and shape that it will easily hold an article at a definite distance from the pivot 2. The bar may have a number of recesses spaced along it in such a way that in one recess one article balances five articles on the platform, in the next recess it balances ten, and so on. As a result the number of articles on the platform can very quickly be counted in fives, tens, or any other suitable and desirable number.

By my invention an ordinary beam scale can be quickly and cheaply made into a counting scale by means of which small articles can be quickly and accurately counted. My invention is particularly useful in taking inventories, or in any similar work requiring much counting of small articles where a great deal of time and labor can be saved by providing an ordinary weighing scale with suitable attachments in accordance with my invention and utilizing it as a counting scale as well as a weighing scale.

My invention may be embodied in many other forms than that shown and described, and I do not wish to be restricted to the precise arrangement disclosed, but intend to cover all changes and modifications within the scope of my invention as set forth in the appended claims.

What I claim and desire to secure by Letters Patent of the United States is:

1. A counting attachment for beam scales comprising a removable counting bar, fastening means for detachably securing said bar to the scale beam in position to be counterbalanced, and a counting cup mounted on said bar eccentric to the pivot of the scale beam and adjustable to increase or decrease its distance from said pivot but normally fixed in position to hold an article at a distance from said pivot unchanged during counting and such that one article in said cup balances a definite and convenient number of identical articles on the scale platform.

2. The combination with a weighing scale having a pivoted weighing beam and a scale pan, of a detachable counting bar on said beam, holding means on said bar adjustable toward and away from the pivot of said beam and normally fixed in position to hold an article to be counted at a distance from the pivot of said beam such that one article held by said means balances a convenient number of identical articles on said scale pan, and an equalizer on said beam adjustable independently of said holding means.

3. In a weighing and counting scale, the combination with a scale pan and a pivoted weighing beam, of a removable counting bar detachably secured to said beam, a counting cup immovably fixed to said bar during the counting at such a distance from the pivot of said beam that one of the articles to be counted when placed in said cup balances some multiple of five identical articles on the scale pan, and an equalizer attached to said beam to neutralize the weight of said bar and cup.

4. In a weighing and counting scale the combination with a pivoted weighing beam of a removable counting bar detachably secured to said beam and having at a plurality of points along said bar holding means for an article identical with the articles to be counted, said points being so spaced along the bar that the difference between the number of articles on the scale platform balanced by an identical article held in said means at any one point and the number balanced by said article when held by said means at the next adjacent point is the same for all adjacent points, and an equalizer detachably secured to said beam to neutralize the weight of said bar.

5. A counting attachment for beam weighing scales comprising a counting bar having holding means fixed along it at a plurality of points in such relation to one another and to the pivot of the scale beam that the number of articles balanced by an identical article held by said means at one point is a multiple of the number of articles balanced by an identical article held by said means at another point.

6. A counting attachment for beam weighing scales comprising a removable bar, means for at will attaching said bar to the scale beam, a counting cup adjustably mounted on said bar and normally fixed thereto to hold an article eccentric to the pivot of said beam at a distance unchanged during counting and such that one article in said cup balances a convenient number of identical articles on the scale, an equalizer for counterbalancing the weight of said bar and cup, and means for at will attaching said equalizer to the scale beam.

7. In a counting attachment for beam scales, a counting bar for forming an extension of the scale beam and comprising parallel clamping members spaced apart to embrace the end of the scale beam and having recesses for receiving the beam pin in said beam, means for clamping said members to the beam, and a counting cup mounted on said bar to be adjustable lengthwise thereof and normally fixed on said bar.

In witness whereof I have hereunto set my hand this 30th day of June, 1914.

JERE BROPHY.

Witnesses:
F. T. SHANNON,
MARGARET A. DELEHANTY.